United States Patent [19]
Kobayashi et al.

[11] 3,892,936
[45] July 1, 1975

[54] PROCESS FOR ELECTRICAL DISCHARGE SHAPING AND APPARATUS THEREFOR UTILIZING DIFFERENT SHAPE WAVE FORMS

[75] Inventors: Kazuhiko Kobayashi, Seto; Toshiro Oizumi, Nagoya, both of Japan

[73] Assignee: Mitsubishi Denki Kabushiki Kaisha, Japan

[22] Filed: Feb. 7, 1974

[21] Appl. No.: 440,546

[30] Foreign Application Priority Data
Feb. 19, 1973 Japan................48-19964

[52] U.S. Cl............ 219/69 P; 219/69 C; 219/69 M
[51] Int. Cl.............................................. B23p 1/08
[58] Field of Search............ 219/69 C, 69 P, 69 M; 307/24, 29, 30, 31, 82; 315/224, 225, 332

[56] References Cited
UNITED STATES PATENTS
2,796,509 6/1957 Blake................................ 219/69 P
3,257,583 6/1966 Pfau.................................. 219/69 P
3,705,287 12/1972 Saito et al. ....................... 219/69 P

*Primary Examiner*—Bruce A. Reynolds
*Attorney, Agent, or Firm*—Oblon, Fisher, Spivak, McClelland & Maier

[57] ABSTRACT

A process and apparatus for electrical discharge shaping of a workpiece by intermittently applying a pulse voltage across a working gap between the workpiece and an electrode, wherein the waveform of the discharge pulse current is changed from a rectangular form to another form having a slant line, such as a triangular form, depending upon the time interval from the application of the pulse voltage to initiation of the discharge such that consumption of the electrode is minimized.

7 Claims, 17 Drawing Figures

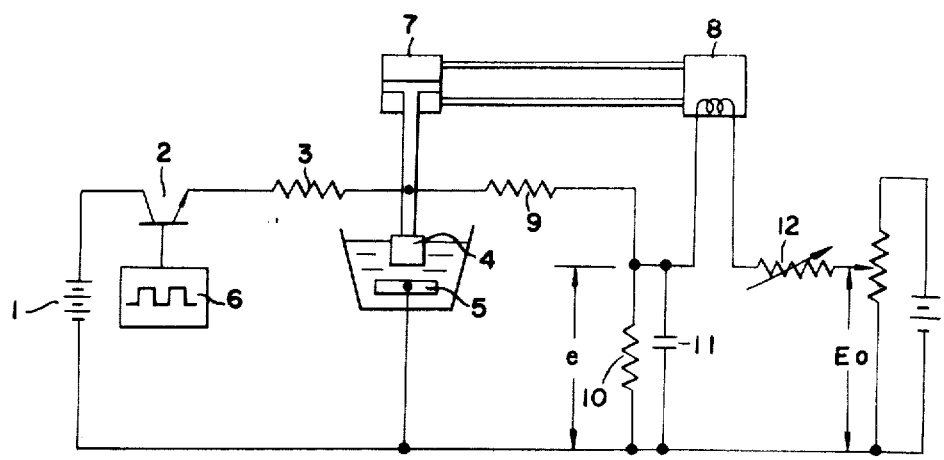
F I G. I PRIOR ART
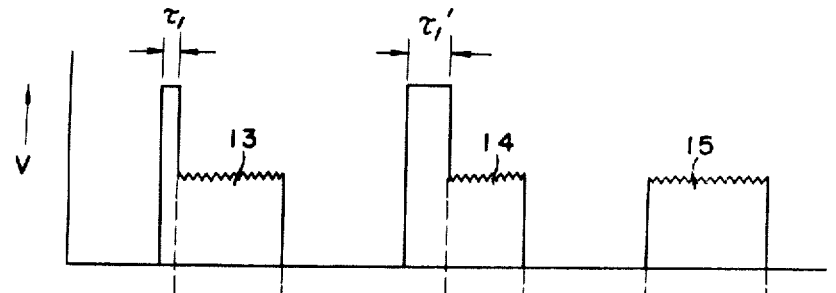
FIG. 2 (a) PRIOR ART
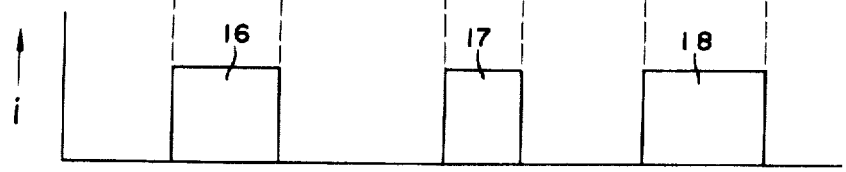
FIG. 2 (b) PRIOR ART 3,892,936
SHEET 2
FIG. 3
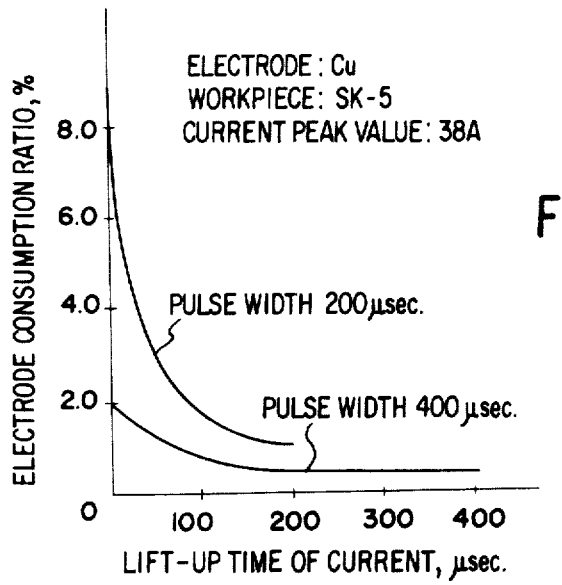
FIG. 4(a)
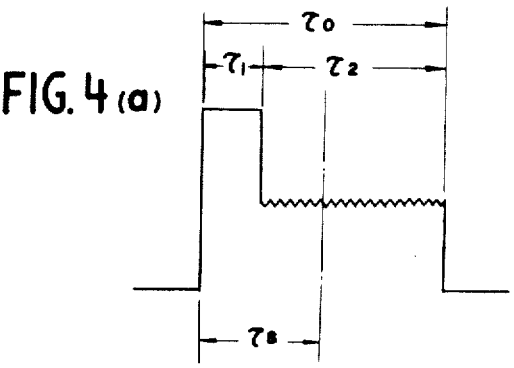
FIG. 4(b) CURRENT WAVEFORM OF $\tau_1 \leq \tau_s$
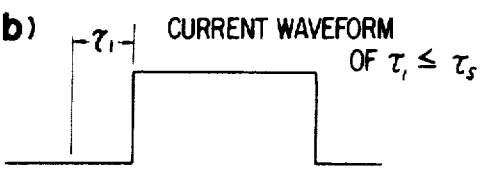
FIG. 4(c) CURRENT WAVEFORM OF $\tau_1 > \tau_s$
FIG. 5(a)
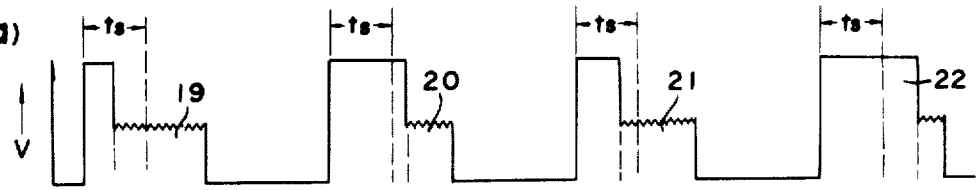
FIG. 5(b)
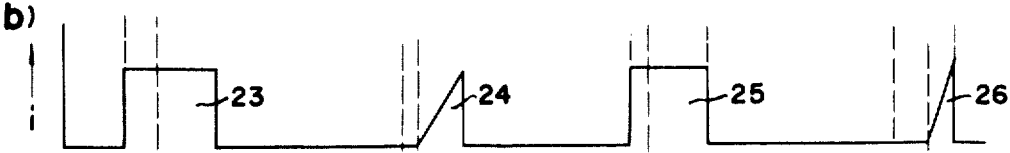
FIG. 5(c)
PRIOR ART
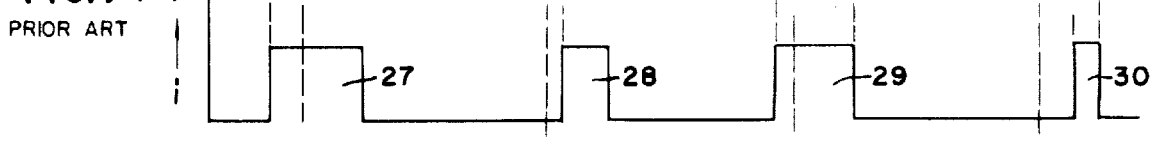

FIG. 9A TRANSISTOR (2a) 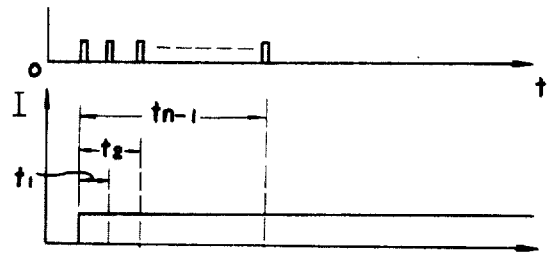
FIG. 9B TRANSISTOR (2b) 
FIG. 9C TRANSISTOR (2c) 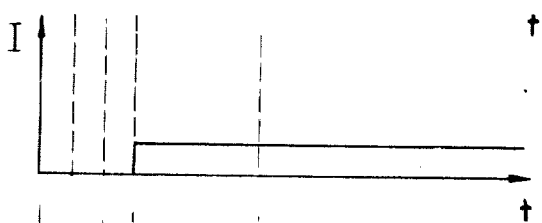
FIG. 9N TRANSISTOR (2n) 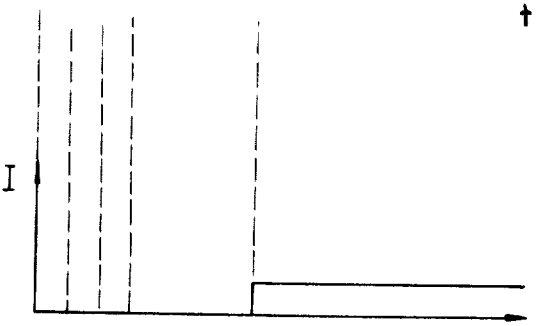

PROCESS FOR ELECTRICAL DISCHARGE SHAPING AND APPARATUS THEREFOR UTILIZING DIFFERENT SHAPE WAVE FORMS

BACKGROUND OF THE INVENTION

1. Field of the Invention

This invention relates to a process and apparatus for the electrical discharge shaping of a workpiece by intermittently passing a pulse current between the workpiece and an electrode such that the waveform of the discharge pulse current is changed from a rectangular form to another form depending upon a condition of the working gap such that consumption of the electrode is minimized.

2. Description of the Prior Art

FIG. 1 shows a conventional circuit for generating a pulse which is applied to a gap between a workpiece 5 and an electrode 4. The pulse current so generated and which is passed to the gap between the workpiece 5 and the electrode 4 is controlled by a resistor 3 through the switching of the current of a DC power source 1 by the On-OFF switching of a transistor 2. The switching frequency of the transistor 2 can be changed to various ones by a signal transmitted from a control signal transmitting circuit 6.

On the other hand, the width of the gap is conventionally controlled and maintained constant by a servo mechanism which includes a hydraulic cylinder 7 and a servo valve 8 for controlling the oil volume. A control voltage $e$ V, corresponding to the electrode voltage (the voltage between the electrode 4 and the workpiece 5), is compared with a reference voltage $E_o$ V and is controlled such that the difference between the voltage is zero. The reference numerals 9 and 10 designate resistors for dividing the electrode voltage, 11 designates a condenser forming a filter and 12 designates a variable resistor for adjusting the servo sensitivity. The electrode voltage waveforms and the discharge current waveforms in the prior art embodiment of FIG. 1 are usually as shown in FIGS. 2a and 2b.

FIGS. 2a plots the waveform V of the electrode voltage versus time $t$, and FIG. 2b plots the waveform $i$ of the discharge current versus time $t$. The electrode voltage waveform 13 shows the case wherein a pulse voltage applied across the working gap discharges after a certain delay time $\tau_1$. The waveform 14 shows the case wherein the pulse voltage discharges after a certain time delay $\tau_1'$ ($\tau_1$ is less than $\tau_1'$); and the waveform 15 shows the case wherein the pulse voltage discharges without any delay. The discharge current waveforms corresponding to the electrode voltage waveforms 13, 14 and 15 are shown in FIG. 2b as 16, 17 and 18, respectively.

While somewhat satisfactory, a disadvantage and problem with respect to the waveforms shown in FIGS. 2a and 2b which results from the prior art conventional apparatus is that the discharge current pulse time (pulse width) is not constant due to various factors affected by the working gap conditions. Accordingly, the electrode consumption ratio is disadvantageously low because of the varying pulse width, as shown in FIG. 3.

A need therefore existed for a process and apparatus using a rectangular current pulse wherein the lift up of the current pulse waveform is slow for providing the same discharge current peak such that, as shown in FIG. 3, consumption of the electrode can be minimized.

SUMMARY OF THE INVENTION

Accordingly, it is an object of this invention to provide a new and improved unique process and apparatus for electrical discharge shaping of a workpiece by intermittently applying a pulse voltage across a working gap between the workpiece and an electrode with each quiescent time.

It is another object of this invention to provide a new and improved unique process and apparatus for electrical discharge shaping of a workpiece by changing the waveform of a discharge pulse current depending upon a time interval from application of the pulse voltage across said working gap to initiation of discharge so as to decrease a consumption of the electrode.

Briefly, in accordance with the present invention, the foregoing and other objects are attained by the provision of a process and apparatus for electrical discharage shaping of a workpiece by controlling a discharge pulse current so as to provide a rectangular waveform when a time interval from application of the pulse voltage across the working gap to the initiation of discharge is within a predetermined time interval, but controlling it with another shape waveform when the time is over the predetermined time interval.

BRIEF DESCRIPTION OF THE DRAWINGS

The foregoing and various other objects, features and attendant advantages of the present invention will be more fully appreciated as the same becomes better understood from the following detailed description when considered in connection with the accompanying drawings, in which:

FIG. 1 is a schematic diagram of a prior art apparatus for shaping a workpiece through electrical discharge by applying a controlled pulse in a working gap;

FIG. 2 is an electrode voltage and current waveforms of the prior art process of FIG. 1;

FIG. 3 is a characteristic graph showing relations between the lift up of a current waveform and an electrode consumption ratio;

FIGS. 4a, 4b and 4c are waveforms of pulses applied across the working gap according to the present invention;

FIGS. 5a, 5b and 5c are waveforms of pulses in a practical operation of the present invention and in a conventional operation;

FIGS. 9A, 9B, 9C, 9N and 9X are triangular waveforms of the current pulse formed by the circuit of FIG. 7.

DETAILED DESCRIPTION OF A PREFERRED EMBODIMENT

Figure 6:
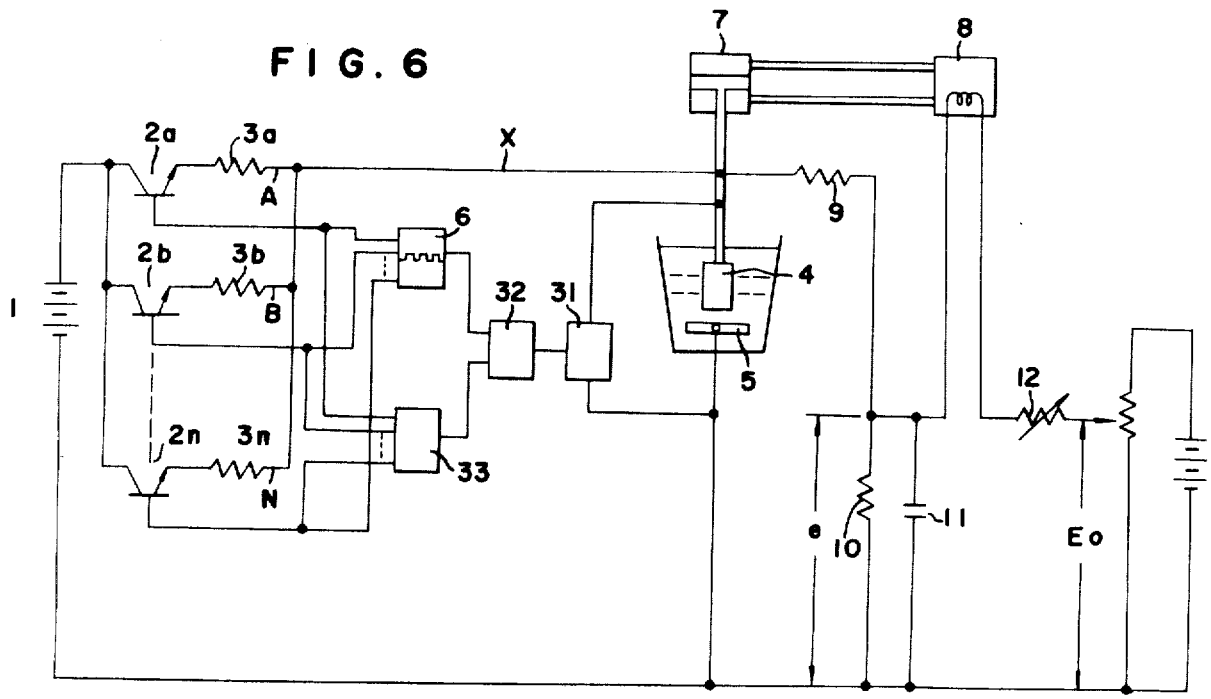
FIG. 6 is a circuit of one preferred embodiment of the apparatus according to the present invention.

Referring now to the drawings, wherein like reference numerals designate identical or corresponding parts throughout the several views and more particularly to FIGS. 4a–4c thereof wherein a principle of the present invention is illustrated. In FIG. 4a a waveform of the voltage pulse applied between an electrode and workpiece wherein $\tau_o$ indicates the time interval for applying a pulse voltage; $\tau_1$ indicates the time interval for applying a voltage in a non-load condition; $\tau_2$ indicates a time interval for discharging and $\tau_o = \tau_1 + \tau_2 =$ constant. A predetermined time interval $\tau_s$ is decided and when $\tau_1 \leq \tau_s$, the pulse current having a rectangular waveform as shown in FIG. 4b is applied.

When $\tau_1 > \tau_s$, the pulse current having a triangular waveform as shown in FIG. 4c is applied, so that a pulse current rectangular waveform having a width shorter than $\tau_s$ can be eliminated, whereby the electrode consumption rate can be remarkably decreased in comparison with the conventional process.

FIG. 5a shows voltage waveforms of pulses applied across the working gap in a practical operation of the invention and FIGS. 5b and 5c show a current waveform of the present invention and a conventional process, respectively.

In FIGS. 5a–5c, the discharge voltage waveforms 19 and 21 are given in $\tau_1 \leq \tau_s$, and accordingly, the current waveforms 23 and 27 are the same rectangular waveform and the current waveforms 25 and 29 are the same rectanguar waveform. However, when the waveforms 20 and 22, are given, then the rectangular current waveforms 28 and 30 are not given, but instead the triangular waveforms 24 and 26 are given, since $\tau_1 > \tau_s$.

As shown in FIG. 3, when the discharging time interval becomes shorter, that is when the width of the pulse becomes shorter, a difference occurs in the electrode consumption rates between processing by a rectangular waveform and by a triangular waveform.

Accordingly, it is clear that the processing according to the present invention can remarkably decrease the electrode consumption rate as compared with the conventional processing by rectangular waveforms.

With the present invention, it is possible to provide pulse current waveforms having a slant line, such as a trapezoid or triangular waveform and thereby decrease the electrode consumption rate.

Incidentally, in the described embodiment a voltage pulse having a constant width is applied across the working gap. However, it should be understood that the width of the voltage pulse can be different. Also, the process of the present invention can be applied to the case wherein a voltage pulse having a constant width of the current pulse is applied.

The apparatus of one preferred embodiment of the present invention is shown in FIG. 6, wherein the reference numeral 31 designates a detector for detecting an initiation of discharge and the numeral 32 designates a device for comparing the delay time interval $\tau_1$ from the application of a voltage across the working gap to the initiation of discharge with the predetermined time interval $\tau_s$. The numeral 6 designates an independent conventional rectangular waveform oscillator; 33 designates an oscillator for forming triangular waveforms of the current pulse applied therein; 2a, 2b . . . 2N designate transistors corresponding to the transistor 2 of FIG. 1; and 3a, 3b, . . . , 3n designate resistors corresponding to the resistor 3 of FIG. 1. When the initiation of discharge is detected by the detector 31, the delay time interval $\tau_1$ from the application of voltage across said gap to the initiation of discharge can be compared with the predetermined time interval $\tau_s$.

When $\tau_1 \leq \tau_s$, a rectangular pulse current is passed across the working gap by actuating the rectangular oscillator circuit 6. When $\tau_1 > \tau_s$, a slant line pulse current is passed across the working gap by actuating the triangular pulse current from the oscillator 33 in order to complete the process of the invention.

The oscillator 33 generates triangular waveform pulse currents by sequentially turning on the transistors 2a, 2b, . . . 2n.

Figure 7:
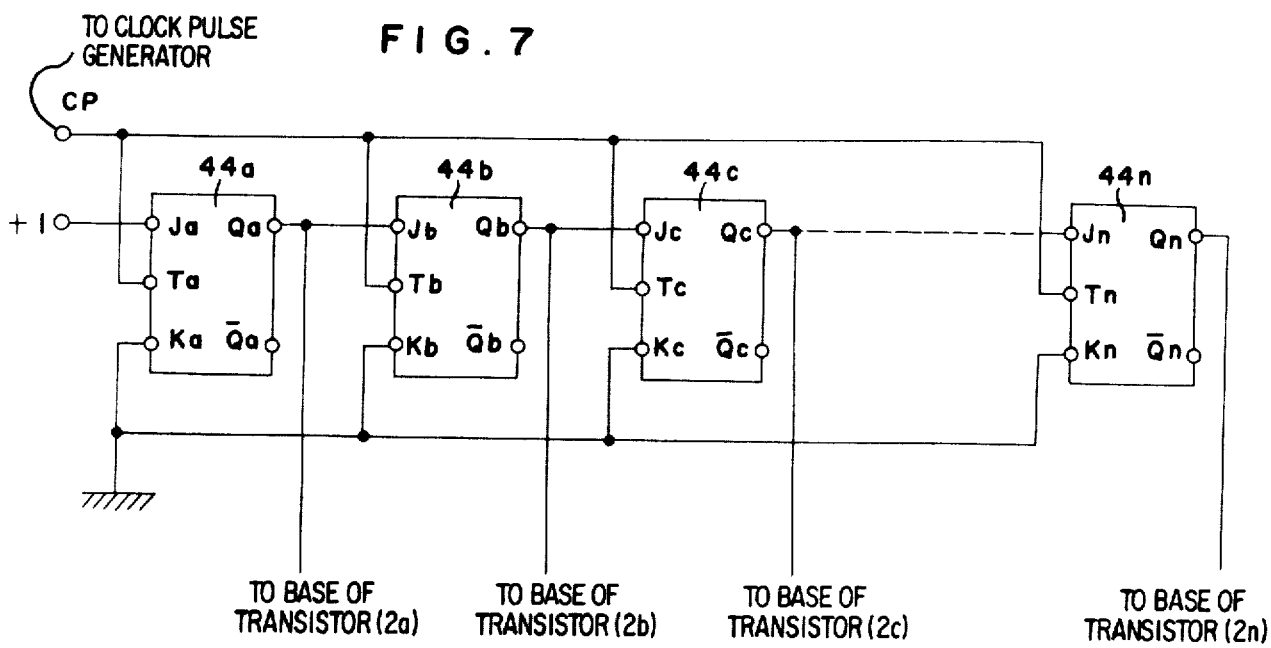
FIG. 7 is a circuit suitable for forming a triangular current pulse for use in the embodiment of FIG. 6.

One embodiment of the circuit 33 for transmitting a triangular waveform pulse current, is shown in FIG. 7, wherein the reference numerals 44a, 44b, 44c, . . . 44n designate conventional J-K flip-flops. Initially, all of the output terminals Qa, Qb, Qc, . . . Qn are set as a logical 0 and the input terminal Ja is set as a logical 1. In said condition, when a clock pulse CP of a logical 1 is applied from a clock forming circuit (not shown in the drawing) to the input terminals Ta, Tb, Tc, . . . Tn, then the output terminals of the flip-flops will change to Qa = 1, Qb = 0, Qc = 0 . . . Qn = 0. The output Qa which is now a logical 1 is passed to the base of the switching transistor 2a, so as to turn on the switching transistor 2a. As shown in FIG. 7, the output terminal Qa is connected to the input terminal Jb so that the input terminal Jb is now set to a logical 1.

Subsequently, when the next clock pulse CP of a logical 1 is provided, the outputs of the flip-flops will change to be Qa = 1, Qb = 1, Qc = 0, . . . Qn = 0, whereby the switching transistor 2b is also turned on (the switching transistor 2a being kept turned on). In the same manner, the switching transistors 2c . . . 2n are sequentially turned on, in order.

Figure 8:
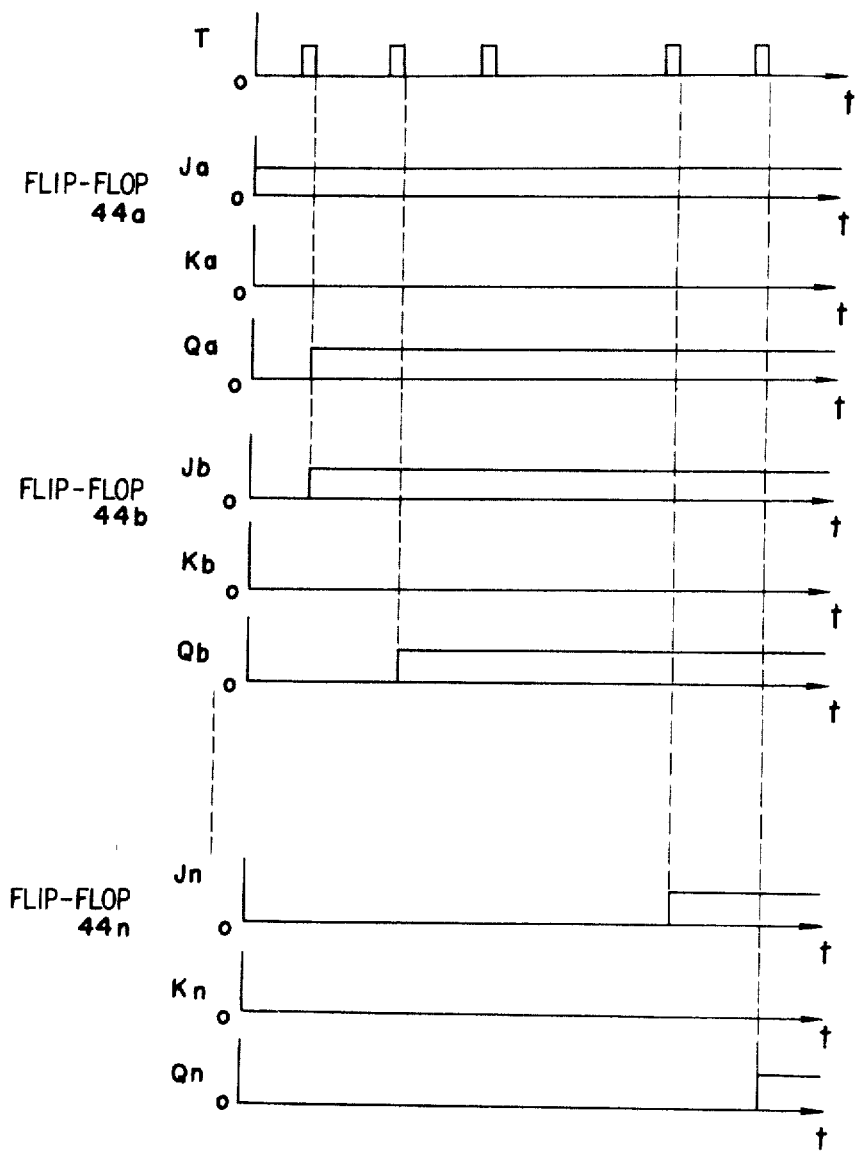
FIG. 8 is a graph for illustrating the operation of the circuit of FIG. 7.

The waveforms of each of the flip-flops with respect to time are shown in FIG. 8, and the conditions of the current passing through the switching transistors 2a, 2b, . . . 2n are shown in FIGS. 9A,B,C,N and X. The current at the point when the transistor 2a is turned on is shown in FIG. 9A.

Figure 9X:
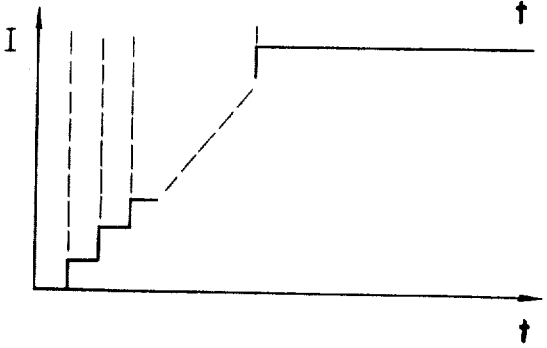

The currents when the transistors 2b, 2n are respectively turned on after a delay time $t_1, t_2, \ldots t_{n-1}$ from the time of turning on of the transistor 2a, are shown in FIGS. 9B, 9C, . . ., 9N. When the current passing in FIG. 9X is indicated as $I_X$ and the currents passing in FIGS. 9A, 9B, 9C, . . . 9N are respectively indicated as $I_A, I_B, I_C, \ldots I_N$ the following equation can be given.

$$I_X = I_A + I_B + I_C \ldots + I_N$$

The mode of lift-up of the current can be changed in a wide range by selecting the time intervals $t_1, t_2, \ldots t_{n-1}$ from the turn-on of the transistor 2a to the turn-on of the subsequent transistors 2b, 2c, . . . 2n. In order to sequentially turn off the transistors in the circuit for transmitting and controlling a signal of FIG. 7, there is provided Ja = Jb = Jc = . . . Jn = 0, Ka is connected to Qb; Kb is connected to Qc; Kc is connected to Qd and the outputs connecting to the transistors 2a, 2b, 2c . . . 2n are provided from Qa, Qb, Qc . . . Qn.

Obviously, numerous modifications and variations of the present invention are possible in light of the teachings herein. Thus, any number of suitable circuits can be given by suitable combinations of sequential turn-ons and sequential turn-offs. It is also possible to employ a device for forming a triangular pulse current and the like by distorting a rectangular pulse current through a reactor and a condenser, as the circuit for forming various waveform current pulses. Moreover, in the present embodiment the current waveform is changed from a rectangular current pulse under a constant current peak value. However, it is possible to change the current peak value, in accordance with the invention. It is therefore to be understood that within the scope of the appended claiams the invention may be practiced otherwise than as specifically described herein.

What is claimed as new and desired to be secured by letters patent of the United States is:

1. An apparatus for electrical discharge shaping which comprises:
   a workpiece;
   an electrode disposed opposite to said workpiece to form a working gap therebetween;
   a switching element for controlling a pulse voltage applied from a power source across said working gap between said workpiece and said electrode;
   a first signal transmitter for controlling said switching element so as to pass a discharge pulse current having a rectangular waveform across said working gap;
   a second signal transmitter for controlling said switching element so as to pass a discharge pulse current having a differing waveform having a slant line across said gap; and
   a control device for selectively driving either of said first and second signal transmitters depending upon whether the time interval between the application of the pulse voltage and the initiation of discharge is less than or is greater than a predetermined time interval.

2. The apparatus according to claim 1, which comprises:
   means for detecting the initiation of discharge across said working gap;
   means for comparing the time interval from the application of the pulse voltage to the initiation of discharge with a predetermined time interval; and
   means for driving said signal transmitter by an output of said means for comparing the time interval.

3. The apparatus according to claim 1, wherein said switching element comprises a plurality of transistors connected in parallel, and wherein an output of said first and second signal transmitters are each connected to the base circuit of each of said plurality of transistors.

4. The apparatus according to claim 3, wherein said second signal transmitter transmits a signal so as to sequentially switch said plurality of transistors.

5. A method for shaping a workpiece which is separated by a gap from an electrode by applying a voltage between the workpiece and the electrode comprising:
   applying a no-load voltage between the electrode and the workpiece,
   detecting the duration of the no-load voltage,
   comparing the duration of the no-load voltage to a predetermined duration,
   generating a rectangular discharge current wave form between the electrode and the workpiece if the detected duration of the no-load voltage is less than the predetermined duration,
   generating a slant line discharge current wave form between the electrode and the workpiece if the detected duration of the no-load voltage is greater than the predetermined duration so as to decrease consumption of the electrode.

6. Apparatus for shaping a workpiece which is separated by a gap from an electrode by applying a voltage between the workpiece and the electrode comprising:
   a workpiece,
   an electrode separated from the workpiece by a gap,
   means for applying a no-load voltage between the electrode and the workpiece,
   means for detecting the duration of the no-load voltage,
   means for comparing the duration of the no-load voltage to a predetermined duration,
   means for generating a rectangular discharge current wave form between the electrode and the workpiece if the detected duration of the no-load voltage is less than the predetermined duration,
   means for generating a slant line discharge current wave form between the electrode and the workpiece if the detected duration of the no-load voltage is greater than the predetermined duration so as to decrease consumption of the electrode.

7. Apparatus for shaping a workpiece in accordance with claim 6 wherein the means for detecting the duration of the no-load voltage comprises means for detecting initiation of discharge across the gap.

* * * * *